(12) United States Patent
Poole

(10) Patent No.: US 10,829,165 B1
(45) Date of Patent: Nov. 10, 2020

(54) MODULAR TRUCK BED STORAGE ASSEMBLY

(71) Applicant: FORGED AUTHORITY LLC, Dyersville, IA (US)

(72) Inventor: Wesley Poole, West Liberty, IA (US)

(73) Assignee: FORGED AUTHORITY LLC, Dyersville, IA (US)

( * ) Notice: Subject to any disclaimer, the term of this patent is extended or adjusted under 35 U.S.C. 154(b) by 0 days.

(21) Appl. No.: 15/876,461

(22) Filed: Jan. 22, 2018

Related U.S. Application Data

(60) Provisional application No. 62/448,928, filed on Jan. 20, 2017.

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC .............. B60P 7/08; B60P 7/0807; B60P 7/15
USPC ...... 224/403–405, 510, 554; 248/669, 124.1, 248/125.1, 132, 420, 429, 223.41, 297.21, 248/295.11, 307, 913; 403/83, 380, 324, 403/381
See application file for complete search history.

(56) References Cited

U.S. PATENT DOCUMENTS

| | | | | |
|---|---|---|---|---|
| 4,770,579 A * | 9/1988 | Aksamit | ................... | B60P 7/15 410/120 |
| 5,139,301 A * | 8/1992 | Lewis | ................... | B60N 2/3095 296/63 |
| 5,516,179 A * | 5/1996 | Tidwell | ................... | B60N 2/015 296/63 |
| 6,068,319 A * | 5/2000 | O'Brien | ................... | B60P 1/00 248/243 |
| 6,302,280 B1 * | 10/2001 | Bermes | ................... | B60R 9/00 211/175 |
| 9,920,531 B1 * | 3/2018 | Charest | ................... | E04C 3/12 |
| 2004/0134953 A1 * | 7/2004 | Perez | ................... | B60P 3/40 224/403 |

* cited by examiner

*Primary Examiner* — Scott T McNurlen
(74) *Attorney, Agent, or Firm* — Womble Bond Dickinson (US) LLP

(57) ABSTRACT

A modular truck bed support framework may feature attachment bars and support bars in a gridded relationship, with attachment bars fastening the framework to the truck bed and support bars holding the framework together. Various members may then be applied to the support bars, and possibly attachment bars, to create a customizable support framework in the truck bed.

4 Claims, 4 Drawing Sheets

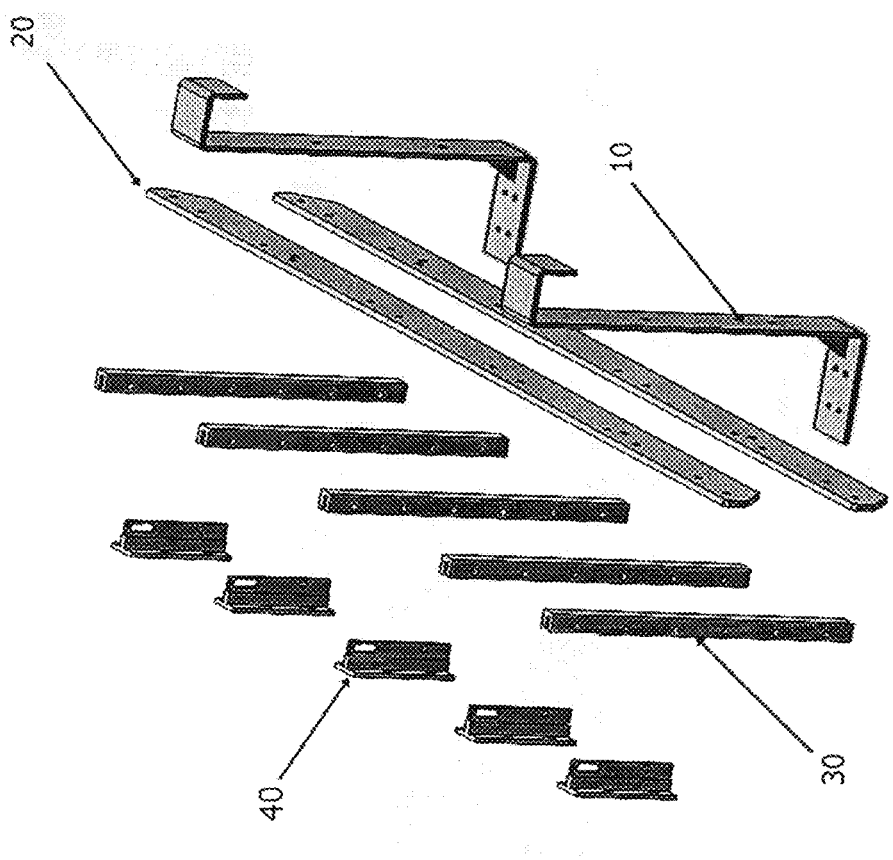

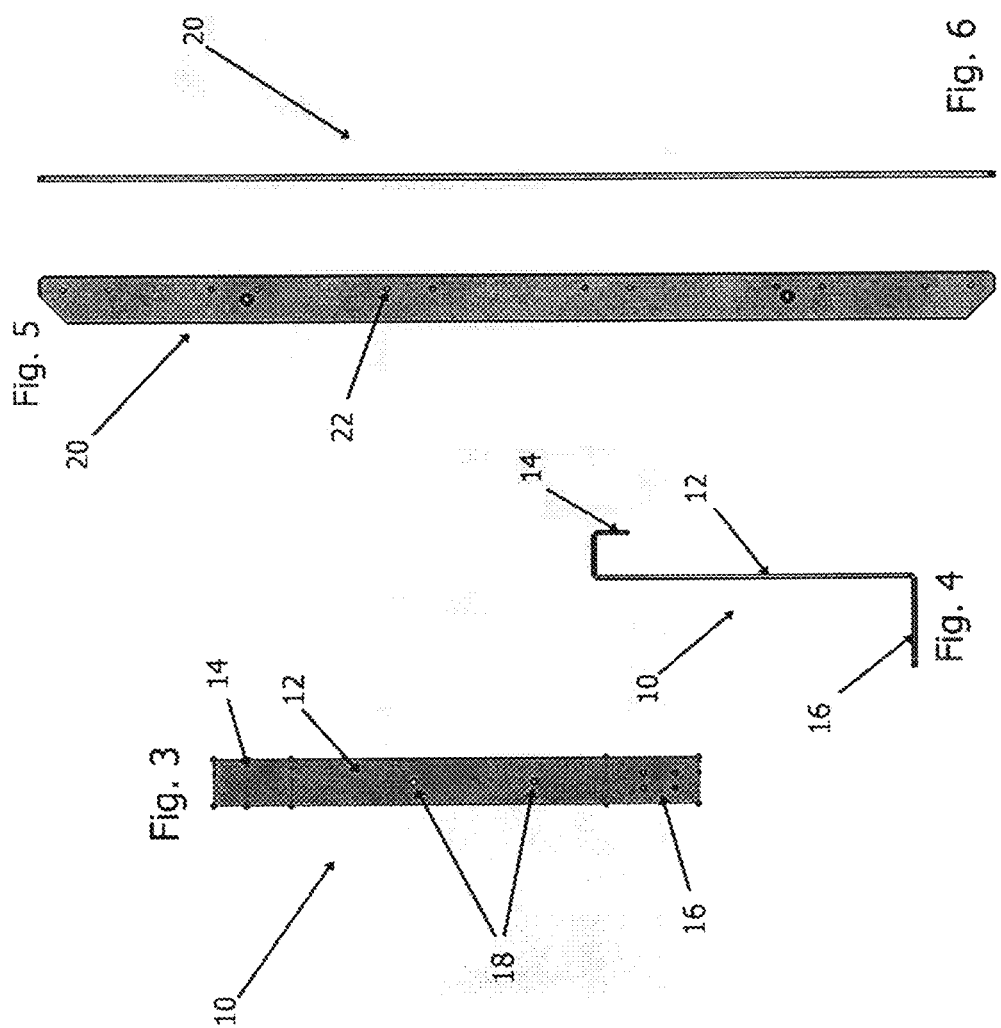

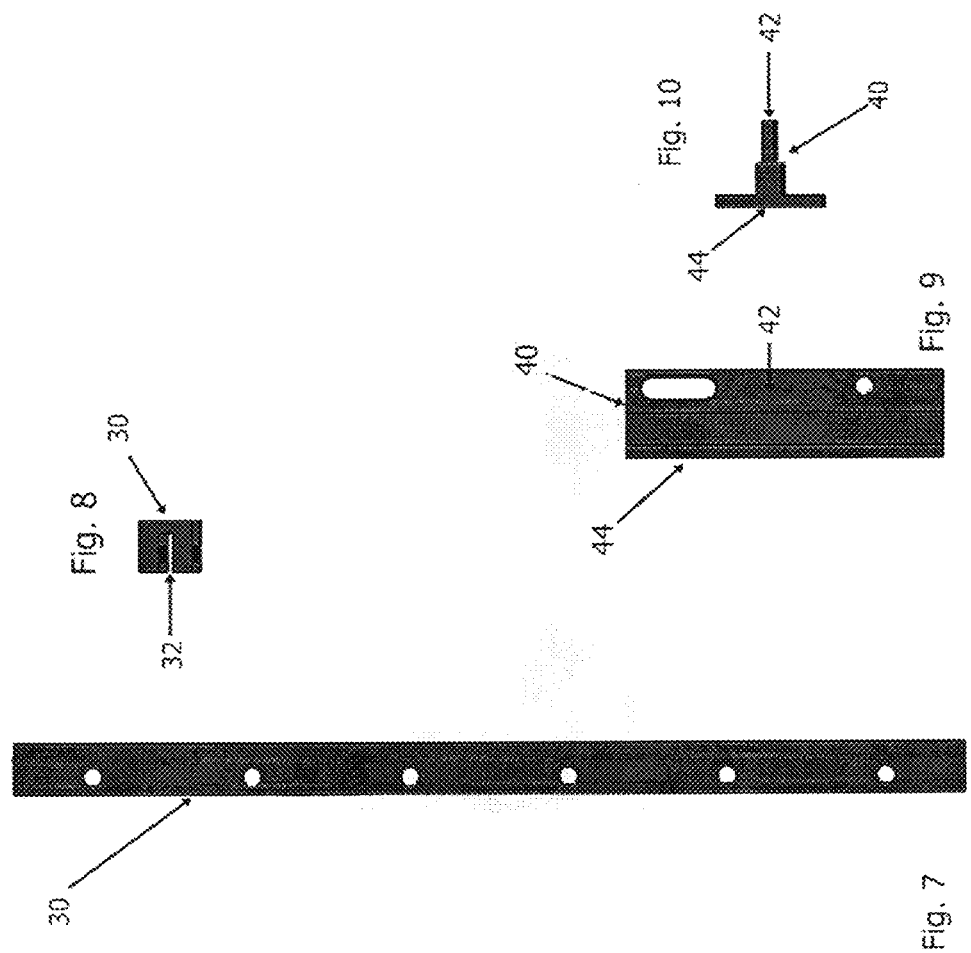

MODULAR TRUCK BED STORAGE ASSEMBLY

FIELD OF THE INVENTION

The present invention relates to the field of storage frameworks and more particularly relates to a modular assembly in which to secure cargo in a truck bed.

BACKGROUND OF THE INVENTION

The modern pick-up truck is a tool with many uses. As vehicles, they are used to carry not only an individual and passengers, but also various forms of cargo from one location to another. The cargo payload may be something as simple as tools, equipment, and supplies to a desired location, personal belongings to a new residence, a portable camper body, or may be a larger payload of materials. In any event, securing the payload in the truck bed is of paramount importance. This may be easily accomplished when the bed is full, as it will often be with larger payloads. However, when the bed is not full, the average truck bed does not have many securement points and structures in which to efficiently secure the smaller payloads. As a result, smaller payloads tend to shift, damaging the payload and possibly causing damage to the truck bed itself. Often, on top of the damage, a smaller payload can also become disordered and chaotic in travel, leading to inefficiency as the jumble is unloaded before work can begin. A system to provide multiple attachment points for such smaller items as tools and supplies is needed. Customization of such a system would then also allow for users to configure a system that makes sense for the user's most common stowage needs.

The present invention is a modular framework which is mountable in the truck bed and is user configurable.

SUMMARY OF THE INVENTION

In view of the foregoing disadvantages inherent in the truck bed, an improved modular organizer may provide a configurable framework that is easily installed and arranged for various stowage configurations. As such, a new and improved truck bed organizing assembly may comprise a plurality of attachment bars and support bars to form a basic frame, then a plurality of module bars on which to mount tools and other items of cargo in order to accomplish these objectives.

The more important features of the invention have thus been outlined in order that the more detailed description that follows, may be better understood and in order that the present contribution to the art may better be appreciated. Additional features of the invention will be described hereinafter and will form the subject matter of the claims that follow.

Many objects of this invention will appear from the following description 20 and appended claims, reference being made to the accompanying drawings forming a part of this specification wherein like reference characters designate corresponding parts in the several view. Before explaining at least one embodiment of the invention in detail, it is to be understood that the invention is not limited in its application to the details of construction and the arrangements of the components set forth in the following description or illustrated in the drawings The invention is capable of other embodiments and of being practiced and carried out in various ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. it is important, therefore, that the claims be regarded as including such equivalent constructions insofar as they do not depart from the spirit and scope of the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is an exploded view of the framework of FIG. 1;

FIG. 3 is a front elevation of a j-bar support for the framework of FIG. 1;

FIG. 4 is a side elevation of the j-bar support of FIG. 3;

FIG. 5 is a front elevation of a support bar for the framework of FIG. 1;

FIG. 6 is side elevation of the support bar of FIG. 5;

FIG. 7 is a front elevation of a female support member for the framework of FIG. 1;

FIG. 8 is a side elevation of the female member of FIG. 7;

FIG. 9 is a front elevation of a male member for the framework of FIG. 1; and

FIG. 10 is a side elevation of the male member of FIG. 9.

DETAILED DESCRIPTION OF THE PREFERRED EMBODIMENT

Figure 1:
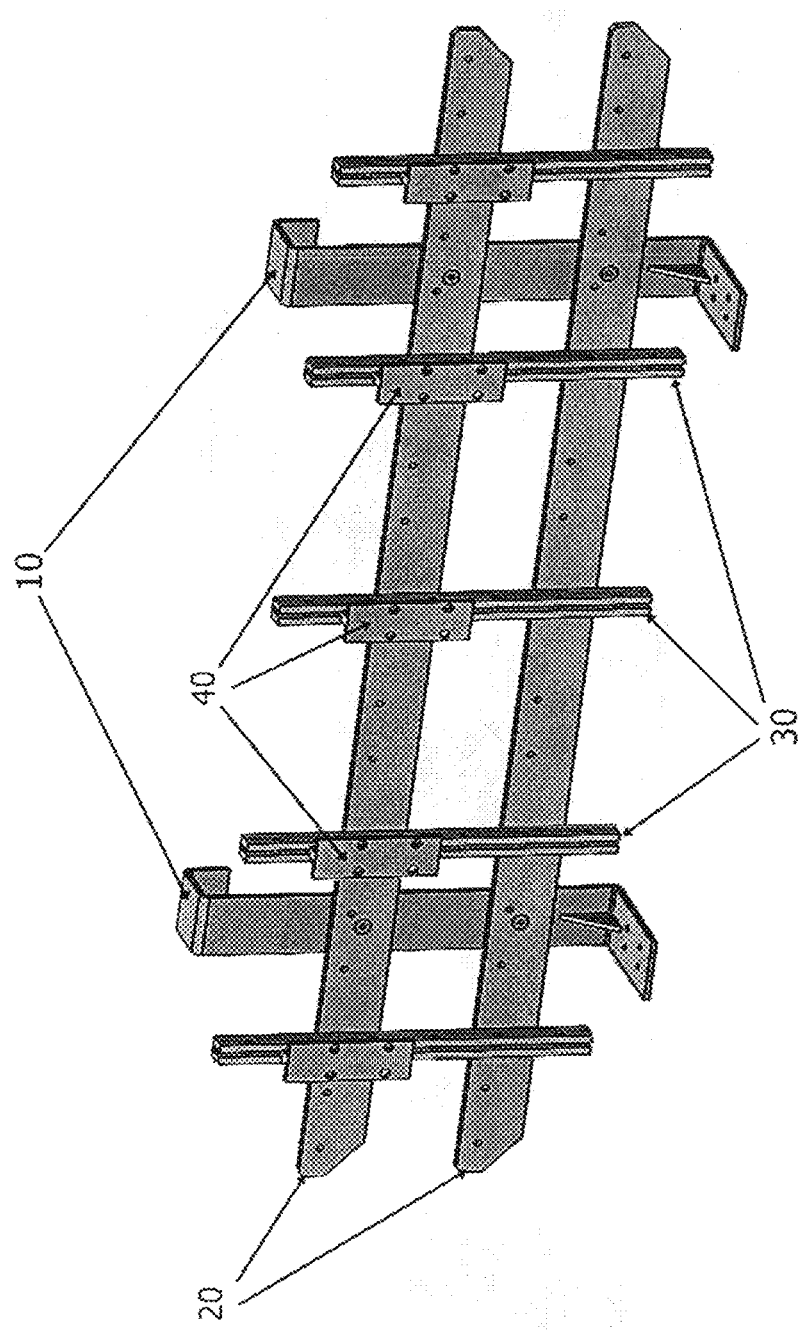
FIG. 1 is a perspective view of a modular storage framework.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C § 112(f).

The best mode for carrying out the invention is presented in terms of its preferred embodiment, herein depicted within the Figures.

With reference to FIGS. 1 and 2, a basic support framework 1 may have a plurality of attachment bars, such as j-bars 10, and support bars 20. Attached to the support bars 20 may be a plurality of female members 30 which in turn hold male members 40. The female members 30 are positionable anywhere on the support bars 20 and the male members 40 may or may not be positioned on the female members 30.

The j-bar 10 (FIGS. 3 and 4) is a simple bar body 12 with a hook 14 at one end and a platform 16 at the other. The hook 14 is positioned over the side of the pickup truck's bed walls and the platform 16 rests on the bed floor, where it may be secured. In the middle of the bar body 12 are mounting holes 18 for support bars 20 (FIGS. 5 and 6). These support bars 20 simply attach horizontally to the j-bars 10 at the holes 18 and present a plurality of slots 22 on which to mount female members 30. The female members 30 (FIGS. 7 and 8) are a simple slotted bar which mount vertically on the support bars 20. Slots 32 provide an interface for the male members 40 (FIGS. 9 and 10). The male members feature a tab 42 to interface in the slots 32 and bosses 44. It should be noted that cargo may be stowed on or attached to any component of the framework. The tab interface 42 for the male members 40 may be manufactured into any type of container so as to allow attachment to the framework 1. Likewise, any container may be made with an appropriate to interface to latch or secure onto the support bars 20, female members 30, or even j-bars 10.

Although the present invention has been described with reference to preferred embodiments, numerous modifications and variations can be made and still the result will come within the scope of the invention. No limitation with respect to the specific embodiments disclosed herein is intended or should be inferred. It should also be noted that the framework may be adapted to other vehicles.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A system for securing items in a vehicle comprising:
   a securing mechanism for rigid attachment to an inside surface of a vehicle storage area, wherein the vehicle storage area is a truck bed of a pickup truck and wherein the securing mechanism comprises:
      two or more J-shaped attachment brackets, wherein each of the two or more J-shaped attachment brackets have a flat lower foot adapted to be secured to a pickup truck bed floor and an upper hook adapted for securing over a pickup truck bed sidewall;
   a plurality of horizontal strut members, each horizontal strut member comprising:
      an elongated length; and
      a flat thickness;
      wherein each horizontal strut member is affixed rigidly to the securing mechanism in a lateral, vertically spaced and parallel orientation;
   a plurality of vertical track members, each vertical track member comprising a vertical length with an outwardly facing groove or slot spanning the vertical length and a flat rear surface rigidly affixed to each of the plurality of horizontal strut members, and wherein each vertical track member comprises a plurality of vertically spaced attachment holes for receiving a mechanical fastener;
   at least one trigonal cargo attachment bracket comprising:
      a flat outer surface adapted to affix to an item of cargo;
      an attachment tongue perpendicular to said flat outer surface,
   wherein the attachment tongue is received in the slot or groove spanning one of the vertical track members of the plurality of track members, and wherein the slot or groove of the vertical track members are longer than the attachment tongue to provide a plurality of vertical attachment positions for the attachment tongue; and
      a shoulder offset to contact the flat outer surface when the attachment tongue is inserted in the slot or groove of one of the vertical track members to maintain a repeatable penetration of the attachment tongue into the slot or groove; and
      a first attachment hole for receiving a first removable fastener and second attachment hole for receiving a second removable fastener, wherein
   the second attachment hole is elongated for vertical adjustment; and
   a cargo item attached directly to one of the at least one trigonal cargo attachment brackets.

2. The system of claim 1, wherein each said vertical track members is formed of an extruded metal channel having a U-shaped cross sectional profile.

3. The system of claim 1, wherein each said horizontal strut member comprises an elongated, flat metal sheet secured matingly to a face of each J-shaped attachment bracket.

4. The system of claim 3, wherein each said vertical track members is formed of an extruded metal channel having a U-shaped cross sectional profile.

\* \* \* \* \*